(12) United States Patent
Brissette et al.

(10) Patent No.: US 7,391,793 B2
(45) Date of Patent: Jun. 24, 2008

(54) TANDEM CONNECTION MONITORING IMPLEMENTING SINK FUNCTIONALITY ON EGRESS WITHOUT AN EGRESS POINTER PROCESSOR

(75) Inventors: Patrice Brissette, Hull (CA); Ronald Joseph Gagnon, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1239 days.

(21) Appl. No.: 10/391,049

(22) Filed: Mar. 18, 2003

(65) Prior Publication Data
US 2004/0184489 A1 Sep. 23, 2004

(51) Int. Cl.
*H04J 3/06* (2006.01)
(52) U.S. Cl. ........................................ 370/509
(58) Field of Classification Search .............. None
See application file for complete search history.

(56) References Cited

U.S. PATENT DOCUMENTS

| | | | | |
|---|---|---|---|---|
| 5,086,438 A * | 2/1992 | Sugata et al. | ............... | 375/365 |
| 5,461,622 A * | 10/1995 | Bleickardt et al. | ............ | 370/470 |
| 6,188,692 B1 * | 2/2001 | Huscroft et al. | ......... | 370/395.51 |
| 6,502,197 B1 * | 12/2002 | Raza | ............................ | 713/400 |
| 6,765,933 B1 * | 7/2004 | Michel et al. | ................. | 370/539 |
| 6,885,632 B1 * | 4/2005 | Mattson | ....................... | 370/216 |
| 2001/0043603 A1 * | 11/2001 | Yu | .............................. | 370/393 |
| 2002/0141455 A1 * | 10/2002 | Akaike et al. | ............... | 370/535 |
| 2003/0031204 A1 * | 2/2003 | Ho et al. | ...................... | 370/471 |

* cited by examiner

*Primary Examiner*—Huy D. Vu
*Assistant Examiner*—Phuongchau Ba Nguyen
(74) *Attorney, Agent, or Firm*—Guerin & Rodriguez, LLP; William G. Guerin (57) ABSTRACT

A method of transmitting path overhead data between an ingress section and an egress section of a network element is described. A portion of the path overhead data is inserted into one or more predetermined bytes of the transport overhead of the data frame before transmission to the egress section. Consequently, the egress section does not require a pointer processor to retrieve the desired path overhead data. Elimination of the pointer processor results in reduced complexity and cost for the network element. The method can be applied to tandem connection monitoring (TCM) and other processes in which path overhead data are transferred.

13 Claims, 7 Drawing Sheets

TANDEM CONNECTION MONITORING IMPLEMENTING SINK FUNCTIONALITY ON EGRESS WITHOUT AN EGRESS POINTER PROCESSOR

FIELD OF THE INVENTION

The invention relates generally to synchronous digital communication systems. More particularly, the invention relates to a method for implementing tandem connection monitoring (TCM) without the use of a pointer processor on egress.

BACKGROUND

Synchronous digital communication systems arrange data into frames according to a predetermined format defined by standard protocols, such as SONET and synchronous digital hierarchy (SDH). Data can be transmitted over a path that includes multiple segments, or "tandem paths", with each tandem path being managed by a different network operator. The beginning point and termination point of the tandem path are referred to as the source and the sink, respectively. If an error or other fault occurs in the path, the tandem path causing the fault needs to be identified so that the appropriate network operator can take the required action. TCM provides a means for a network operator to quickly determine whether the fault is present in its network or whether the fault exists within a tandem connection managed by a different network operator.

TCM data are carried in a byte in the path overhead (POH) portion of the data frame. Because the position of the POH can vary for different data frames, a pointer processor is required to find the TCM data. The International Telecommunication Union (ITU) standard G.707, option 2 specifies one implementation of TCM in which the TCM sink is present in the egress portion of the network element. The pointer processor enables sink functionality on egress by identifying the TCM data and the appropriate return data are provided to the TCM source on ingress for the reverse path. The addition of a pointer processor requires additional circuit elements (e.g., gates) and increased area in the network element, resulting in higher costs.

Accordingly, there exists a need for a digital communication system that can provide TCM sink functionality on egress without the use of an egress pointer processor. The present invention satisfies this need and provides additional advantages.

SUMMARY

In one aspect, the invention features a method of transmitting path overhead data between an ingress section and an egress section of a network element. The method includes reading data in at least one byte of a path overhead of a data frame in the ingress section of the network element. The method also includes inserting at least a portion of the data read from the one or more bytes into at least one predetermined byte of a transport overhead of the data frame and transmitting the data frame having the inserted data to the egress section of the network element. In one embodiment, the method also includes reading the data in the one or more bytes. In another embodiment, the step of reading data includes reading data in at least one byte of a path overhead for each of a first data frame and a second data frame received in a network frame period.

In another aspect, the invention features a method of tandem connection monitoring between two network elements. One of the network elements has an ingress section and an egress section. The method includes reading tandem connection data from a byte in the path overhead of a data frame received by the ingress section, inserting at least a portion of the tandem connection data into one or more predetermined bytes in a transport overhead of the data frame, and transmitting the data frame having the inserted tandem connection data to the egress section. In one embodiment, the byte in the path overhead is the Z5 byte of a SONET data frame or SDH data frame. In another embodiment, the method also includes reading the data in the one or more predetermined bytes in the transport overhead of the transmitted data frame.

In another aspect, the invention features a network element. The network element includes an ingress section, a backplane and an egress section. The ingress section has a module to insert path overhead data into one or more bytes of a transport overhead of a data frame. The backplane is in communication with the ingress section and the egress section. The egress section includes a module to read the inserted path overhead data from the one or more bytes of the transport overhead of the data frame. In one embodiment, the backplane is a cross connect switch. In another embodiment, the inserted path overhead data includes tandem connection monitoring data. In yet another embodiment, the network element also includes an additional ingress section that is in communication with the backplane. The additional ingress section includes a module to insert path overhead data into one or more bytes of the transport overhead of the data frame.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention provides a method for transferring specific path overhead data received on ingress over a backplane to egress in a network element. In general, a portion of the path overhead data is inserted into one or more predetermined bytes of the transport overhead of the data frame before-transmission to the egress section. Consequently, the egress section does not require a pointer processor to retrieve the desired path overhead data. Elimination of the pointer processor results in a reduction in complexity (e.g., fewer gates) and a decreased manufacturing cost for the network element. The method can be applied to tandem connection monitoring (TCM) and other processes in which path overhead data are transferred.

Figure 1:
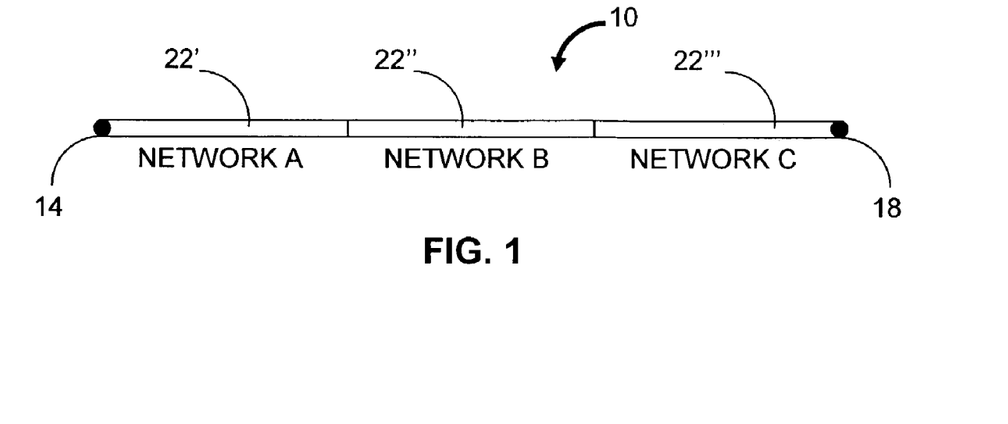
FIG. 1 is an illustration of a path for point to point transmission using three tandem connections.

FIG. 1 depicts a tandem path 10 for point to point transmission between a data source 14 and a destination point 18. The tandem path 10 includes three tandem connections 22', 22" and 22'" (generally 22) representing three independent networks: Network A, Network B and Network C, respectively. The tandem path 10 provides for transmission of data frames in accordance with various digital transmission protocols, such as synchronous optical networking (SONET) and synchronous digital hierarchy (SDH). Although the illustrated tandem path 10 shows three tandem connections 22, a tandem path can be a single tandem connection 22 or can include any plurality of tandem connections 22.

Figure 2:
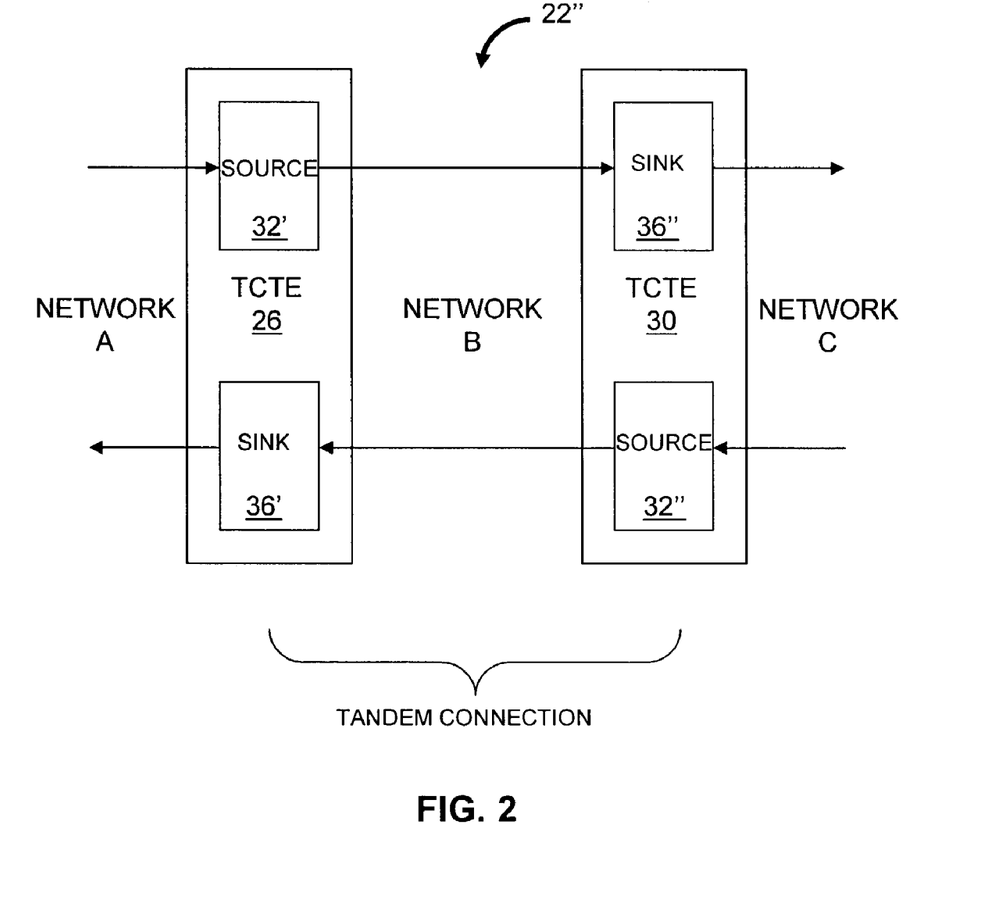
FIG. 2 is an illustration of one of the tandem connections of FIG. 1.

FIG. 2 illustrates the tandem connection 22" for Network B of FIG. 1. The tandem connection 22" includes a first tandem connection terminating element (TCTE) 26 and a second TCTE 30. Each TCTE 26, 30 includes a TCM source 32' and 32", and a TCM sink 36' and 36", respectively. The illustrated tandem connection 22" is bi-directional. Specifically, the TCM starting point and the TCM termination point for data transmitted from left to right are the source 32' of TCTE 26 and the sink 36" of TCTE 30, respectively. The TCM starting point and TCM termination point for data transmitted from right to left are the source 32" of TCTE 30 and the sink 36' of TCTE 26, respectively.

Figure 3:
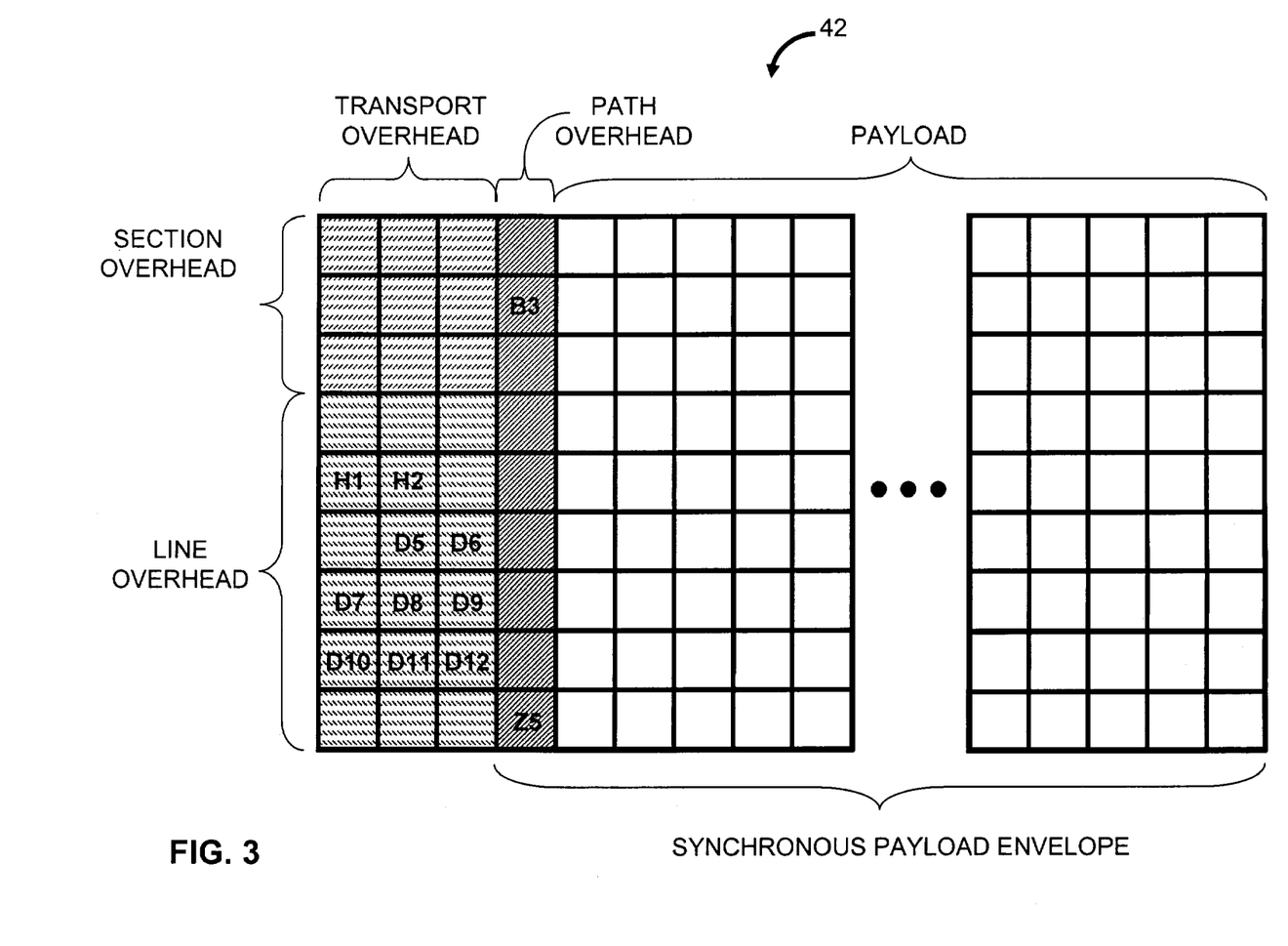
FIG. 3 is a graphical depiction of an STS-1 SONET data frame.

FIG. 3 illustrates an STS-1 SONET data frame 42 represented as a 9 row by 90 column matrix. Each element of the matrix represents a single byte. The frame 42 is divided into a transport overhead (TOH) section and a synchronous payload envelope (SPE). The TOH is divided into a three row by three column section overhead (SOH) and a six row by three column line overhead (LOH). The SPE is divided into a one column path overhead (POH) and a payload. For clarity, only ten columns of the payload are depicted. The TOH remains fixed with respect to the matrix for all data frames 42. The first data byte of the payload can occur at any location within the SPE and the position of the first data byte in the SPE can vary between frames 42 (every 4 frames). For example, the data frame rate can differ from the SPE insertion rate, resulting in a shift in the position of the first byte in the SPE for some data frames 42. A pointer processor is used to read pointer information present in the H1 and H2 bytes of the TOH to determine the position of the first byte within the SPE for each data frame 42.

Figure 4:
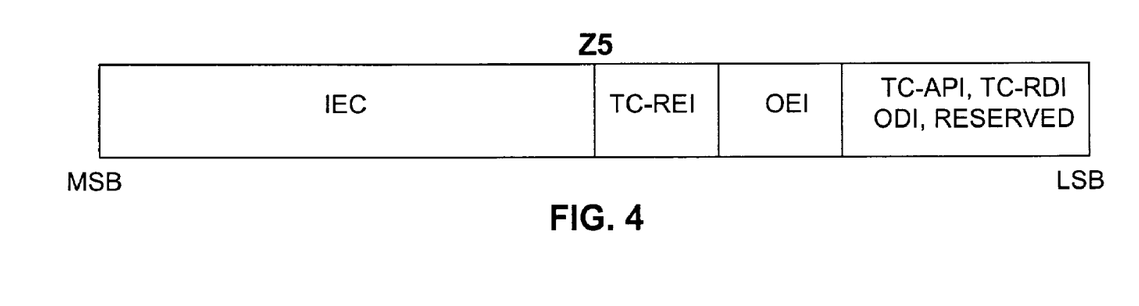
FIG. 4 is a graphical representation of the Z5 byte of a SONET data frame used for tandem connection monitoring.

FIG. 4 illustrates the Z5 byte of the POH used for TCM. The following description of a TCM session refers to FIG. 2, FIG. 3 and FIG. 4. The description relates to unidirectional data flow although the description applies equally to data flow in a reverse direction.

A data frame 42 from Network A is received at the TCM source 32' of TCTE 26. The number of errors indicated by the path bit interleaved parity (BIP) byte (i.e., the B3 byte in the POH) is coded into the incoming error count (IEC) field of the Z5 byte. In order to account for modifications to the POH data at the TCM source 32', the value of the B3 byte is modified, or compensated, prior to transmitting the frame 42 through the tandem connection 22' to the TCM sink 36". At the sink 36", the IEC value is compared to the number of errors indicated by the B3 byte in the received data frame 42 to determine whether any additional errors occurred over the tandem connection 22". The IEC value and the value computed from the B3 byte are identical if no errors have been added to the SPE during transmission through tandem connection 22". If no additional errors are detected, the remote error indication (REI, the fifth bit in the Z5 byte) is set to "0". However, if the IEC value and the computed value differ, the REI is set to "1" to indicate that at least one error occurred within the tandem connection 22" in the other direction.

Figure 5:
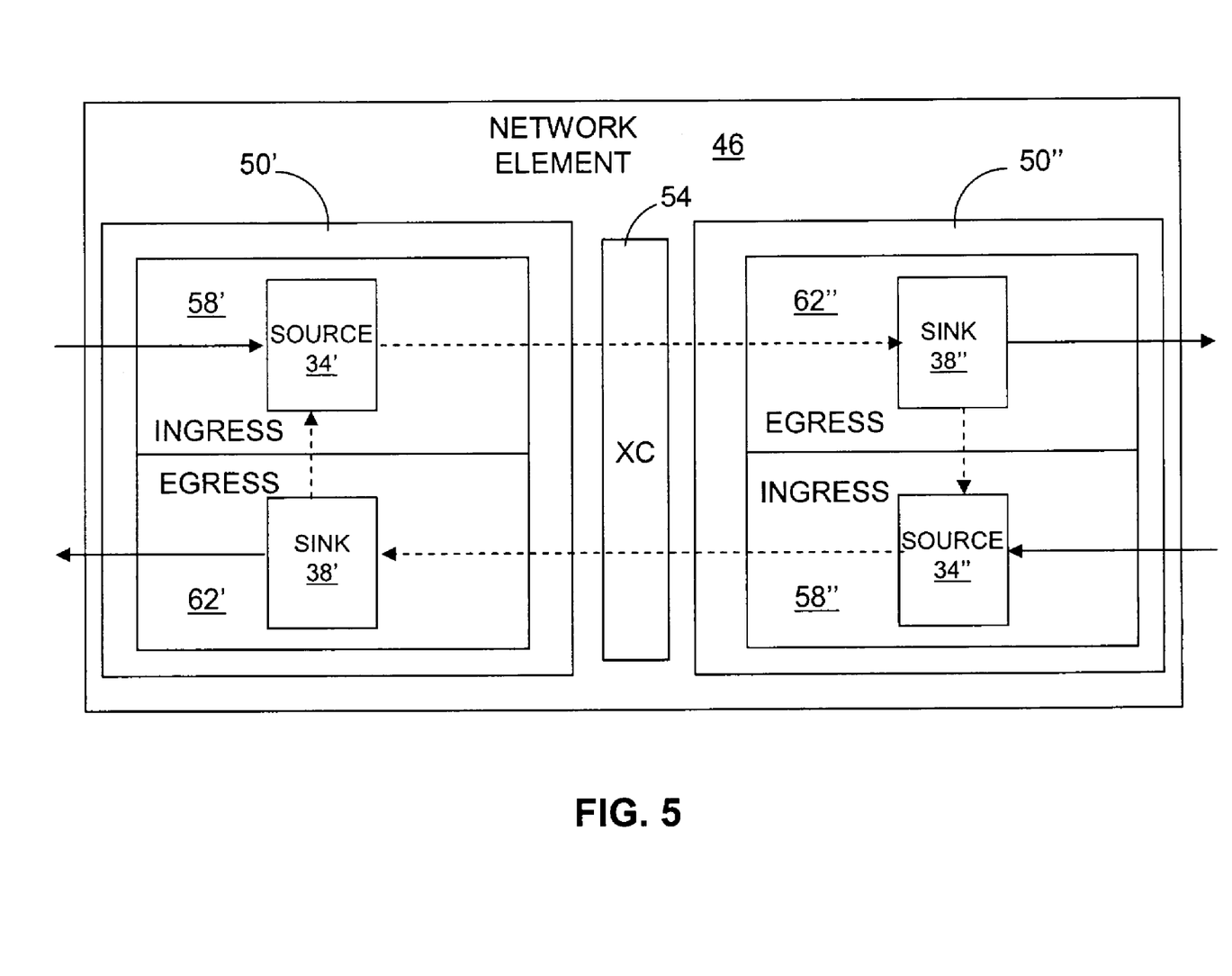
FIG. 5 is a block diagram of a network element at one end of a tandem connection according to the International Telecommunication Union (ITU) standard G.707.

FIG. 5 depicts a network element 46 operating as a TCTE at one end of a network in a tandem connection according to the International Telecommunication Union (ITU) standard G.707. The network element 46 includes two modules 50' and 50" (generally 50) (e.g., application specific integrated circuits (ASICs)) and a backplane 54 (illustrated here as a cross connect switch (XC)). Each module 50 is located (e.g., mounted) on a respective card, or board, which supports the operation (e.g., supplies power and coordinates input/output functions) of the module 50. Each module 50', 50" includes an ingress section 58' and 58", and an egress section 62' and 62", respectively. As used in the text and figures herein, the terms ingress and egress are interchangeable with the terms receiver and transmitter, respectively.

The illustrated network element 46 supports TCM functions for bi-directional data flow. The ingress section 58' of module 50' and the egress section 62" of module 50" process data flowing from left to right. Similarly, the ingress section 58" of module 50" and the egress section 62' of module 50' process data flowing from right to left. The source 34' of module 50' represents the starting point of a tandem connection for data flowing through a network to the right of the network element 46 and the sink 38" of module 50" represents the termination point of a tandem connection for data received from a network to the left of the network element 46. Similarly, the source 34" of module 50" represents the starting point of a tandem connection for data flowing through a network to the left of the network element 46 and the sink 38' of module 50' represents the termination point of a tandem connection for data received from a network to the right of the network element 46. It should be noted that the TCM standard can also be applied to unidirectional data flow. For example, only the ingress section 58' of module 50' and the egress section 62" of module 50" are used for TCM processing if the data flow is only from left to right.

TCM sink functionality includes the monitoring and processing of various parameters, including remote defect indication (RDI), REI (described above), outgoing defect indication (ODI), outgoing error indication (OEI), incoming error count difference count (IEC-diff), access point identifier/loss of frame (API-LOF) and access point identifier mismatch (API-MM) parameters. Sink processing is performed in the egress sections 62. The TCM data are present in the Z5 byte of the POH and, therefore, is not in a fixed location in the data frame. Consequently, a pointer processor is required in each egress section 62 to find the Z5 byte and to enable TCM sink functionality.

Figure 6:
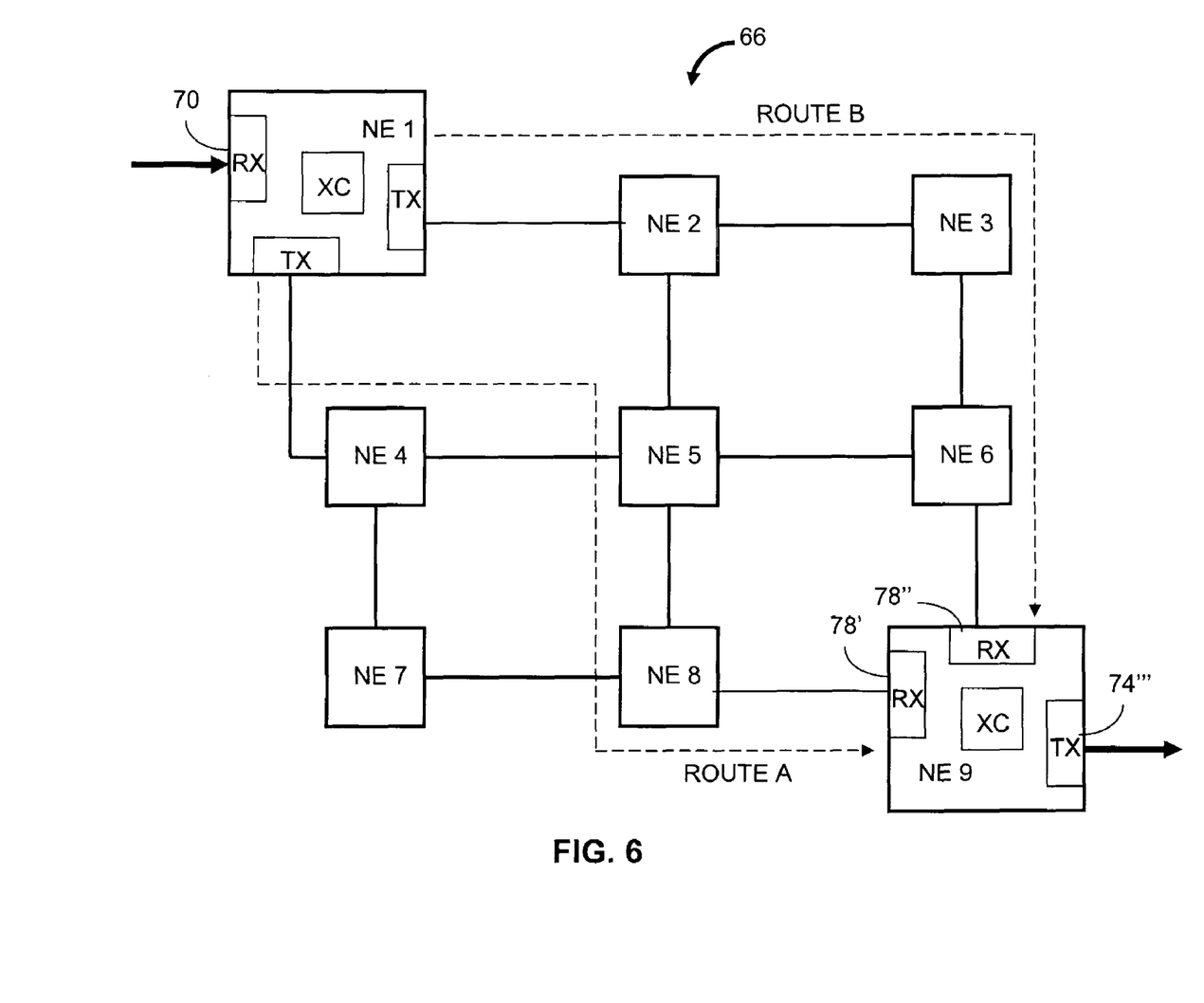
FIG. 6 is a block diagram of an embodiment of a network implementing tandem connection monitoring in accordance with the invention.

Referring to FIG. 6, an embodiment of a network 66 supporting TCM according to the present invention includes a plurality of network elements NE 1 through NE 9. The network 66 carries data received at the receiver section (RX) 70 (i.e., ingress section) at network element NE 1 to the transmitter section (TX) 74'" (i.e., egress section) of network element NE 9. For example, the data are transmitted along route A from network element NE 1 through network elements NE 4, NE 5 and NE 8 to network element NE 9. If a fault occurs along route A, protection switching is implemented so that the data are transmitted along route B from network element NE 1 through network elements NE 2, NE 3 and NE 6 to network element NE 9.

Figure 7:
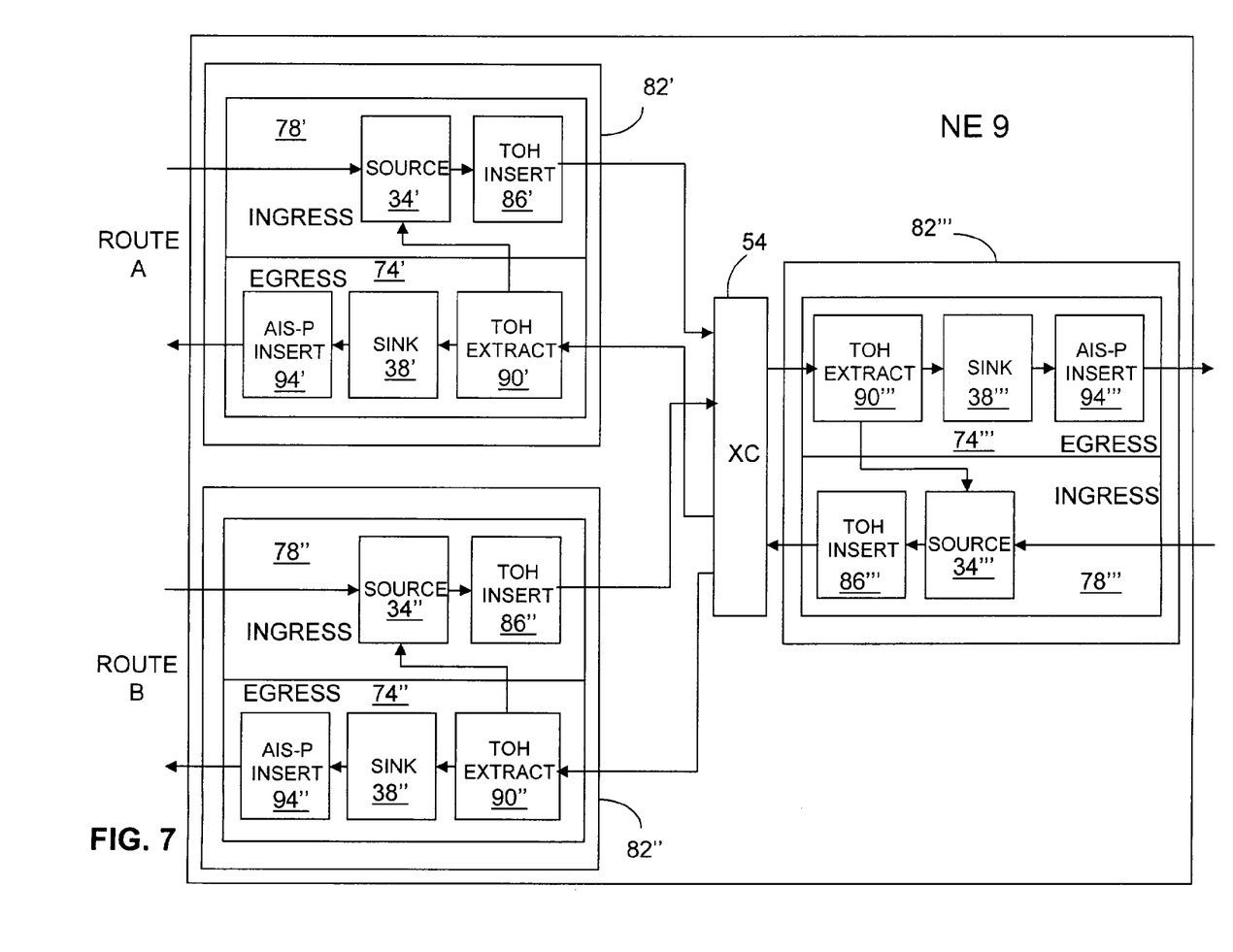
FIG. 7 is a detailed block diagram of a network element of FIG. 6.

FIG. 7 depicts the network element NE 9 of FIG. 6 in more detail. Each ingress section 78', 78" and 78"' (generally 78), and its corresponding egress section 74', 74" and 74"' (generally 74), respectively, for reverse data flow are resident in one device 82', 82" and 82"', respectively, such as an ASIC or other circuit module. In accordance with the ITU G.707 standard, each ingress section 78 includes a TCM source 34', 34" and 34"' and each egress section 74 includes a TCM sink 38', 38" and 38"'. In the illustrated embodiment, each ingress section 78 also includes a transport overhead insertion (TOH insert) module 86', 86" and 86"'. Each egress section 74 also includes a transport overhead extraction (TOH extract) module 90', 90" and 90"' and a path alarm indication signal (AIS-P insert) module 94', 94" and 94"'.

The following description of operation is limited to data flow from left to right in FIG. 5 and follows route A in FIG. 6. It should be recognized that the principles of the invention also apply to a data flow along route B and to a reverse data flow (i.e., data flow from right to left along route A or route B).

In operation, the TOH insert module 86' in the ingress section 78' reads the TCM data in the Z5 byte of the POH. TCM data are then mapped, or copied, into bytes D5, D6 and D7 of the TOH as described below. In other embodiments, the TCM data are mapped into other growth bytes, i.e., LOH bytes reserved for functions not yet defined by SONET or SDH standards. The mapped TCM data are thus transferred from the ingress section 78' to the egress section 74"' through the cross connect switch 54. The TOH extract module 90"' extracts (i.e., reads) the TCM data in the D5, D6 and D7 bytes and TCM sink processing based on the extracted data occurs. TCM data (REI and RDI) are presented to the source 34"' of ingress section 78"' for transmission in the reverse direction. Thus, according to the invention, TCM sink processing occurs on egress without the need for a pointer processor in the egress section 74"'.

In some networks, the software that implements protection switching and the software that implements TCM functions are independent. Thus, if the sink functionality is provided in the ingress sections 78', 78" in such networks, the TCM software does not know which ingress section 78', 78" to use with the TCM sink 38"' if protection switching is enabled. For example, if a fault occurs along route A, data flow can be "switched" to route B upon detection of the fault (see FIG. 6). However, because the TCM sink functionality is implemented in the egress section 74"' of the network element NE 9, the TCM software does not need to know which route was used. Consequently, the network element NE 9 accommodates protection switching implemented in the network 66.

In other embodiments the TCM data are mapped into other growth bytes of the TOH. For example, the TCM data can be inserted into various combinations of LOH data channel communication bytes (e.g., bytes D4 through D12 (see FIG. 3)). In another example, the TCM data are inserted into other LOH bytes. Such LOH bytes are not utilized for other purposes within the network element. It should be recognized that LOH bytes suitable for one network operator for TCM transfer across the backplane according to the invention are not necessarily suitable for a different network operator to practice the invention. However, because the Z5 bytes in the data frames exiting the network element NE 9 are arranged according to the standard format (see FIG. 4), the data transfer through any subsequent tandem connection is unaffected.

Figure 8:
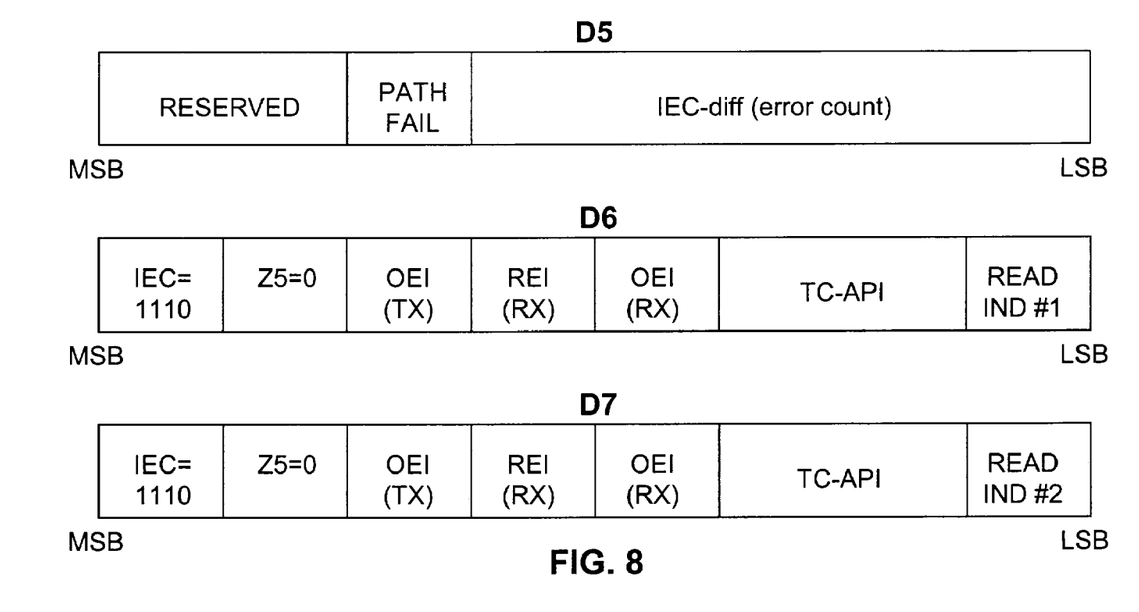
FIG. 8 is a graphical representation of the mapping of tandem connection monitoring data into the D5, D6 and D7 bytes of the path overhead of a SONET data frame in accordance with the invention.

FIG. 8 illustrates one embodiment of the mapping of the TCM data in the Z5 byte into the D5, D6 and D7 bytes of the POH. Each byte is presented from left to right as the most significant bit (MSB, or bit 1) to the least significant bit (LSB, or bit 8). Bits 1 and 2 of the D5 byte are not defined for TCM purposes and are reserved for future use. Bit 3 of the D5 byte indicates whether a path failure has been detected. Path failure is determined, for example, by receipt of an AIS-P signal, a payload mismatch (PLM) or a loss of pointer (LOP). Bit 4 through bit 8 of the D5 byte are used to indicate the difference (IEC-diff) of the IEC and the error count determined from the B3 byte of the POH on ingress.

Referring to the D6 byte, bit 1 is set to one when the IEC value is "1110", i.e., when an incoming AIS-P signal has been received. Bit 2 is set to "1" if it is determined that Z5 is zero. Bit 3, bit 4 and bit 5 are inserted with the values of OEI(TX), REI(RX) and OEI(RX), respectively. OEI(TX) is the OEI that originates (i.e., is generated) at the network element to indicate whether the received B3 byte differs from the expected B3 byte. REI(RX) is the REI received from a subsequent network element. OEI(RX) is the OEI that is received at the network element and TC-API is the tandem connection access point identifier. Bit 6 and bit 7 are used for the tandem connection access point identifier (TC-API). Bit 8 is a read indicator that is set to "1" if the D6 byte contains valid data.

If the data rate of the frames received at the TCM source is less that the data rate of the network, there are occasions when no valid TCM data are received. In this situation, bit 8 of the D6 byte is set to "0". Conversely, if the data rate of the received frames exceeds the data rate of the network, there are occasions when two B3 bytes and two Z5 bytes are received during a network frame period. In this latter instance, the necessary information in the second set of TCM parameters is mapped into the D7 byte, as illustrated, and the bit 8 read indicator is set to "1" to indicate that the D7 byte contains valid data. Moreover, because five bits are available for IEC-diff in the D5 byte, the five IEC-diff bits can be used to indicate the difference of the IEC and the error count for each of the received B3 bytes. Thus the single five bit representation reduces overhead by combining the information that is otherwise carried in 2 four bit representations in separate bytes. Finally, because path failure is generally a long-term condition, there is no accommodation in the illustrated mapping embodiment for a second path failure bit.

Figure 9:
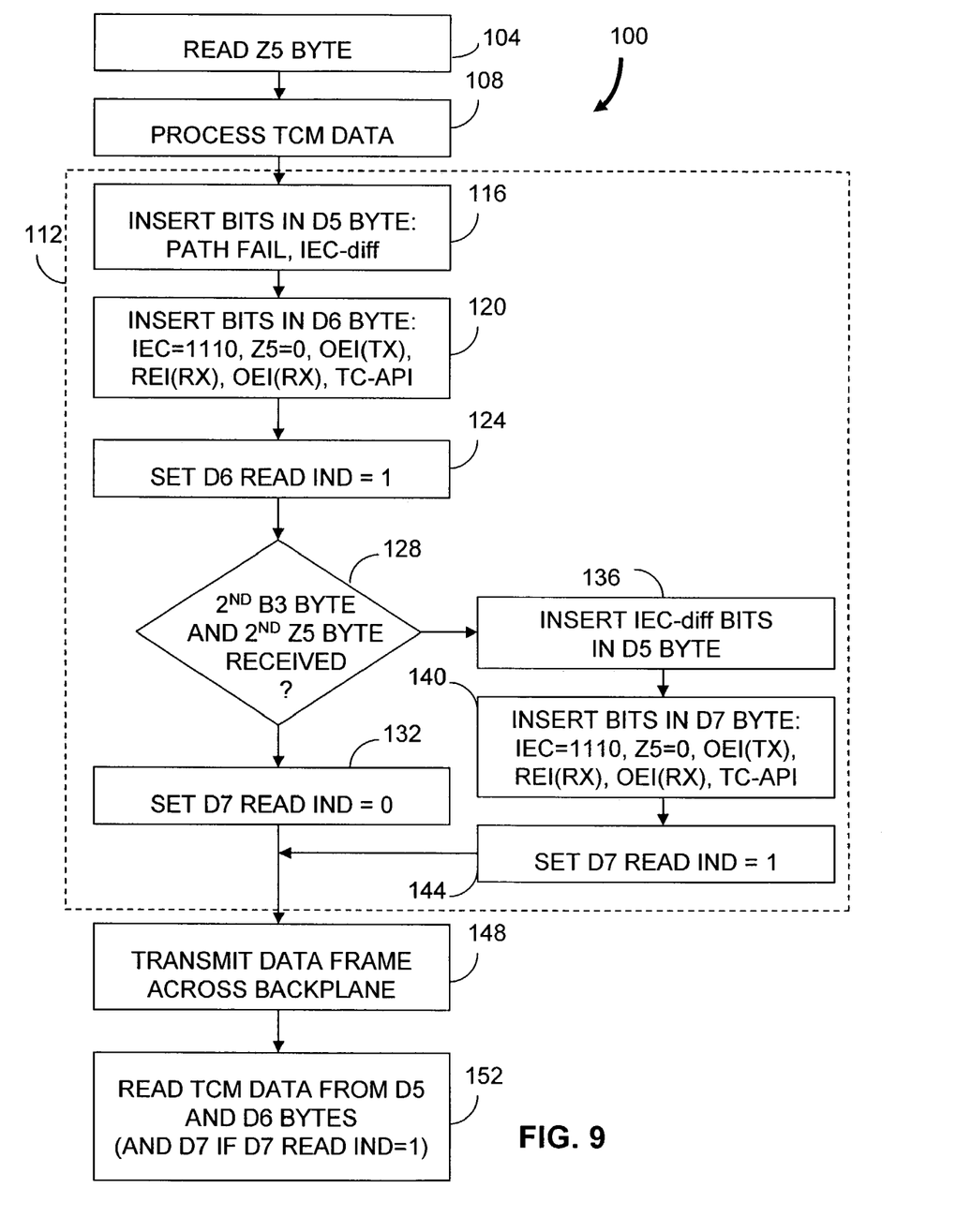
FIG. 9 is a flowchart representation of an embodiment of a method for transmitting path overhead data from ingress to egress in accordance with the invention.

Referring to FIG. 9, an embodiment of a method 100 of transmitting path overhead data between the ingress section and the egress section of a network element is shown. In step 104, the Z5 byte of a received data frame is read. For example, IEC, REI and OEI data are read, or extracted, from the Z5 byte. The TCM data are processed (step 108) to generate the information to be transferred across the backplane to the egress section. Processing includes determining whether a path failure exists and calculating the difference (IEC-diff) of the IEC and the error count determined from the B3 byte of the POH on ingress. Step group 112 includes a plurality of steps for inserting the data into the TOH of the data frame. The steps that are executed depend on the number of frames received during a network frame period. In steps 116 and 120, the bits to be transferred to the egress section are inserted into the D5 byte and D6 byte, respectively. The read indicator bit of the D6 byte is set (step 124) to "1" to indicate the presence of valid data in the D6 byte. In the illustrated method 100, the frame rate of the received data frames exceeds the frame rate of the network element. Consequently, there is always at least one Z5 byte received during a network frame period. If the frame rate of the received data frames were less than the frame rate of the network element, there would occasionally be a network period during which no Z5 byte were received.

Under such an occurrence, the read indicator bit of the D6 byte is set to "0" (not shown) to indicate the lack of valid data in the D6 byte.

The method 100 continues to step 128 to determine whether a second set of POH bytes (including the B3 and Z5 bytes) has been received during the network frame period. Because the frame rate of the received data frames and the frame rate of the network element are nearly equal, usually no second B3 and Z5 bytes are received. Thus the method 100 generally continues to step 132 in which the read indicator bit of the D7 byte is set to "0".

The difference in the data frame rates results in occasional network frame periods during which a second POH is received. In these instances, the method 100 proceeds from step 128 to step 136 in which the five IEC-diff bits of the D5 byte are inserted to indicate IEC-diff for each POH. The method 100 then continues by inserting (step 140) the bits to be transferred to the egress section in the D7 byte. The read indicator bit of the D7 byte is set (step 144) to "1" to indicate the presence of valid data in the D7 byte.

After setting (step 132 or step 144) the read indicator bit of the D7 byte, the data frame is transmitted (step 148) from the ingress section across the backplane to the egress section. The TCM data are read (step 152), or extracted, from the D5 and D6 bytes in the egress section. TCM data are also read from the D7 byte if the read indicator bit of the D7 byte is set to "1" for the data frame.

While the invention has been shown and described with reference to specific preferred embodiments, it should be understood by those skilled in the art that various changes in form and detail may be made therein without departing from the spirit and scope of the invention as defined by the following claims. For example, the path overhead data transferred from ingress to egress need not be related to TCM functionality. In another example, the mapping of data into the line overhead bytes can vary from the mapping scheme described above. In yet another example, the method of the invention can be applied to networks implementing protection switching using more than two receivers in a network element. In addition, it should be recognized that any descriptions herein describing SONET implementations of the invention are not limiting, and that the invention also applies to other network standards, including SDH.

What is claimed is:

1. A method of transmitting path overhead data between an ingress section and an egress section of a network element, the method comprising:
    reading data in at least one byte of a path overhead of a data frame in the ingress section of the network element;
    inserting at least a portion of the data read from the at least one byte of the path overhead into at least one predetermined byte of a transport overhead of the data frame;
    transmitting the data frame having the inserted data in the at least one predetermined byte of the transport overhead to the egress section of the network element; and
    reading the data in the at least one predetermined byte in the transport overhead of the transmitted data frame.

2. The method of claim 1 wherein the step of reading data further comprises:
    reading data in at least one byte of a path overhead of a first data frame received in a network frame period; and
    reading data in at least one byte of a path overhead of a second data frame received in the network frame period.

3. The method of claim 2 wherein the step of inserting further comprises:
    inserting at least a portion of the data read from the at least one byte of the path overhead of the first data frame into a first predetermined byte of a transport overhead of the data frame; and
    inserting at least a portion of the data read from the at least one byte of the path overhead of the second data frame into a second predetermined byte of a transport overhead of the data frame.

4. A method of tandem connection monitoring between two network elements, one of the network elements having an ingress section and an egress section, the method comprising:
    reading tandem connection data from a byte in a path overhead of a data frame received by the ingress section;
    inserting at least a portion of the tandem connection data into at least one predetermined byte in a transport overhead of the data frame;
    transmitting the data frame having the inserted tandem connection data to the egress section; and
    reading the data in the at least one predetermined byte in the transport overhead of the transmitted data frame.

5. The method of claim 4 wherein the byte in the path overhead is the Z5 byte of a path overhead in a SONET data frame.

6. The method of claim 4 wherein the byte in the path overhead is the Z5 byte of a path overhead in an SDH data frame.

7. The method of claim 4 further comprising processing data in another byte in the path overhead of the data frame received by the ingress section to determine the occurrence of transmission errors between the network elements.

8. The method of claim 7 wherein the another byte in the path overhead is the B3 byte of a path overhead in a SONET data frame.

9. The method of claim 7 wherein the another byte in the path overhead is the B3 byte of a path overhead in an SDH data frame.

10. The method of claim 4 wherein the at least one predetermined byte in the transport overhead bytes comprises at least one byte of the line overhead data channels.

11. A network element, comprising:
    an ingress section having a module to insert path overhead data into at least one byte in a transport overhead of a data frame, wherein the inserted path overhead data comprises tandem connection monitoring data;
    a backplane in communication with the ingress section; and
    an egress section in communication with the backplane, the egress section comprising a module to read the inserted path overhead data from the at least one byte in the transport overhead of the data frame.

12. The network element of claim 11 wherein the backplane is a cross connect switch.

13. The network element of claim 11 further comprising another ingress section in communication with the backplane and having a module to insert path overhead data into at least one byte in the transport overhead of the data frame.

* * * * *